US007104439B2

(12) United States Patent
Dewan et al.

(10) Patent No.: US 7,104,439 B2
(45) Date of Patent: Sep. 12, 2006

(54) SYSTEM AND METHOD FOR PREPARING RF DEVICES FOR DELIVERY AND VERIFYING DELIVERY INFORMATION

(75) Inventors: Sunil Dewan, Omaha, NE (US); Fred Casto, Omaha, NE (US); John E. Christensen, Omaha, NE (US); Jon Andrew Gates, Honey Creek, IA (US); Jay E. Greene, III, Omaha, NE (US); Jeff G. Nowlin, Council Bluffs, IA (US); Scott J. Smith, Omaha, NE (US); Mark T. Tonack, Omaha, NE (US); Corey Dean Tunink, LaVista, NE (US); Timothy J. Walpus, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 87 days.

(21) Appl. No.: 10/807,462

(22) Filed: Mar. 23, 2004

(65) Prior Publication Data

US 2005/0211760 A1    Sep. 29, 2005

(51) Int. Cl.
*G06F 17/00* (2006.01)

(52) U.S. Cl. .................................. 235/375; 235/462.46
(58) Field of Classification Search ............... 235/375
See application file for complete search history.

(56) References Cited

U.S. PATENT DOCUMENTS

| 4,106,062 | A  | * | 8/1978  | Foote ........................... 360/15 |
| 5,518,122 | A  | * | 5/1996  | Tilles et al. .................. 209/539 |
| 6,817,530 | B1 | * | 11/2004 | Labrec et al. ............... 235/487 |
| 6,912,398 | B1 | * | 6/2005  | Domnitz ...................... 455/461 |
| 2004/0131760 | A1 | * | 7/2004 | Shakespeare ................ 427/58 |
| 2005/0104718 | A1 | * | 5/2005 | Casto et al. ............... 340/10.1 |
| 2005/0177480 | A1 | * | 8/2005 | Huang .......................... 705/34 |
| 2006/0028319 | A1 | * | 2/2006 | Kean et al. .............. 340/10.51 |

* cited by examiner

*Primary Examiner*—Daniel Stcyr
(74) *Attorney, Agent, or Firm*—Townsend and Townsend and Crew LLP

(57) ABSTRACT

RF devices used in financial and other transactions are moved sequentially to stations of a preparation device that prepares the RF devices for delivery to customers. At one station, an RF reader reads an identification code from the RF device and a label reader reads information on a mailing label. The read information is used to verify the mailing information to assure that the RF device is being delivered to the correct recipient.

24 Claims, 5 Drawing Sheets

SYSTEM AND METHOD FOR PREPARING RF DEVICES FOR DELIVERY AND VERIFYING DELIVERY INFORMATION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

RF (radio frequency) devices have recently become popular for use in financial and similar transactions, e.g., in lieu of using bar codes and magnetic stripes on credit and debit cards. A typical RF device (also sometimes referred to as "RFID tags") includes an RF transponder that transmits an RF identification code in response to radio-frequency waves transmitted by a transceiver. The transceiver may thought of as a reader (analogous to a bar code or magnetic stripe reader). The reader might be found, e.g., at a retail establishment, for purposes of permitting the holder of the RF device to purchase items and conduct other financial transactions. Because the transponder in the RF device may be relatively small, it is conveniently integrated into a wide variety of objects rather than being limited to a standard structure as has been the case for a magnetic-stripe card. For example, RF transponders may conveniently be included in credit cards (and other financial cards or instruments), key fobs, jewelry (e.g., bracelets or necklaces), cell phone covers, and a variety of other types of objects. Financial cards that incorporate RF devices are sometimes referred to as RF or contactless smart cards, and may incorporate various processing and memory components in addition to radio frequency functions.

While the versatility of RF devices provides a diverse array of transaction options, it presents some risks. For example, if the RF device should be lost, stolen or otherwise fall into the hands of someone other than the authorized account holder, it can be used to conduct unauthorized transactions. Typically the RF device (when incorporated into a card, key fob or other device) is mailed to the account holder from an automated preparation and mailing system. The risk of fraud can be reduced by use of a PIN (personal identification number) that is separately mailed to the account holder and that is used by the account holder to activate (via telephone) the account associated with the RF device. However, great care must be taken to assure that the RF device (and PIN) is being mailed to the correct address (and recipient) to avoid fraudulent activation and use. While each RF device and its mailing package can be manually checked for proper mailing labels, such an effort is time consuming and costly.

Systems for assembling, preparing and mailing financial cards are known. For example, reference can be had to U.S. Pat. No. 6,670,569, and U.S. patent application Ser. No. 10/045,589, filed Nov. 8, 2001. Further, systems for assembling, preparing and mailing various RF devices (including financial cards incorporating RF devices) are also known, such as illustrated by U.S. patent application Ser. No. 10/718,481, filed Nov. 19, 2003. All of the forgoing patents and patent applications are commonly owned with the present application, and are hereby incorporated by reference.

BRIEF SUMMARY OF THE INVENTION

Embodiments of the invention provide a method and system for automating the preparation and delivery of RF devices, and for assuring that the RF device are delivered to authorized recipients.

In some embodiments, there is provided automated preparation of RF devices for distribution or delivery. An identification code emitted from the RF device and label information from a mailing label are both read. The identification code and the label information are used to verify the label.

In one embodiment, there is provided a system for preparing an RF device for delivery. The RF device may, for example, be in the form of a key fob or financial card having a standard size, with delivery to an account holder associated with the RF device. The system includes a labeler for preparing a mailing label, an RF reader for reading or receiving an identification code emitted by the RF device, a label reader for reading mailing information from the mailing label, and a processor for accessing a database in response to the operation of at least one of the RF reader and the label reader, for retrieving account holder information from the database, and for using the retrieved information to verify the mailing information from the mailing label.

DETAILED DESCRIPTION OF THE INVENTION

Figure 1:
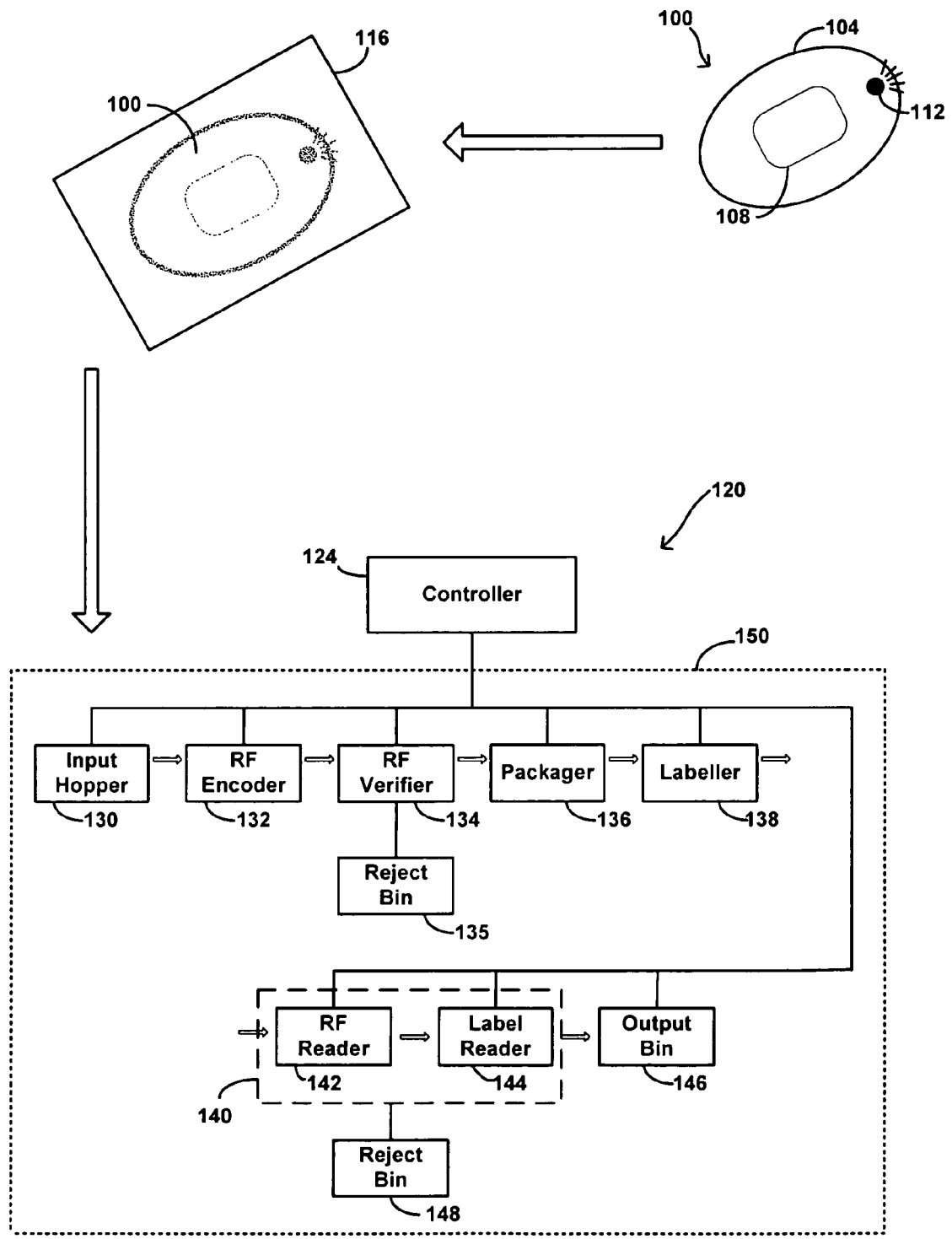
FIG. 1 is a schematic illustration of one embodiment of a system providing automated preparation of RF devices for distribution.

There are various configurations and embodiments for implementing the present invention. One such embodiment is the system seen in FIG. 1, which is accompanied by the flow diagram of FIG. 2 illustrating a method using the system of FIG. 1. The description that follows thus makes simultaneous reference to FIGS. 1 and 2. The illustrated embodiment makes use of techniques to encapsulate the RF device in a package having a standard size, allowing the RF device to be prepared for distribution using existing equipment already adapted for preparation of objects having that size. For example, in FIG. 1, the RF device is a key fob 100, having the standard size of a financial card, and is prepared using a modification of equipment suitable for preparation of financial cards and other presentations instruments. Such instruments (by way of example) may include credit cards, debit cards, gift cards and similar cards. Financial cards have a standard size—a lateral length of approximately 3⅜ inches (85 mm), a height of approximately 2⅛ inches (54 mm), and a thickness of approximately 0.03 inches (0.75 mm), pursuant to ISO standards. However, as will be appreciated as this description progresses, the present invention is not limited to RF devices having the dimensions of financial cards, nor to cards in general.

The structure of the fob 100 itself may include a housing 104 having an activation button 108 and enclosing a RF transponder 112. When encoded, the fob 100 may be used to engage in certain financial transactions, e.g., by locating the fob near an RF reader and activating it with the activation button 108. As will be further understood by those skilled in the art, RF devices such as the fob 100 may also have an RF receiver that will detect an activating RF signal (from a RF reader), and in response thereto provide or emit a RF signal from the fob 100 having an identifying code that identifies the fob (without activating button 108). Thus, fob 100 may be read either by using activation button 108, or by merely passing the fob near an RF reader. The code read from the fob 100 is then used to identify a financial account to be used in the transaction.

In the preparing RF devices for mailing, typically a plurality of the devices may be received, as indicated at block 204 of FIG. 2.

Figure 2:
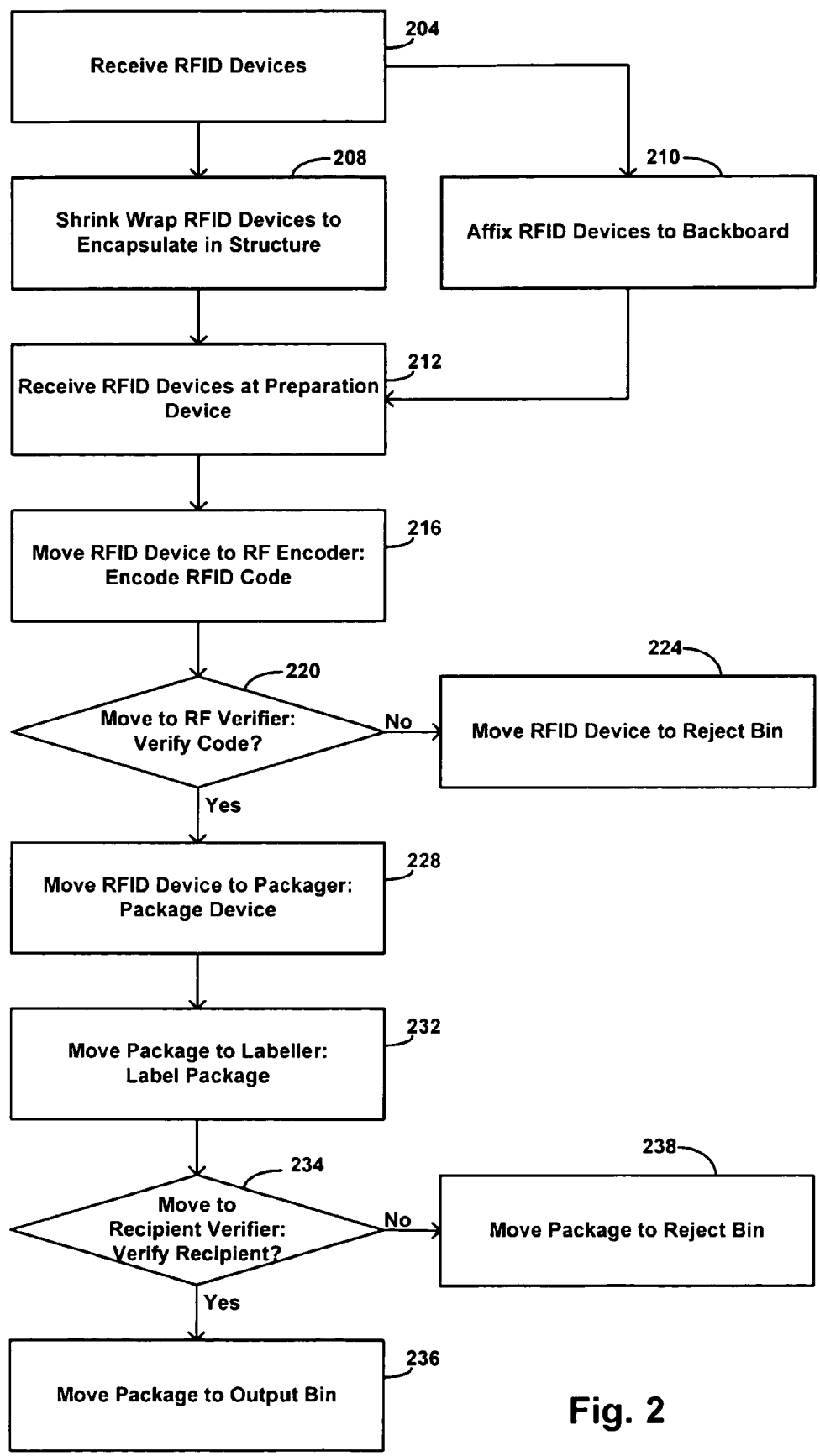
FIG. 2 is a flow diagram illustrating a method for automated preparation of RF devices for distribution using the system of FIG. 1.

Each of the plurality of devices is encapsulated in material to produce a package 116 having a standard (financial card) size, as shown in FIG. 1. Encapsulation of the devices does not interfere with the operation of the RF transponders 112 within the devices because the encapsulating material is selected to be substantially transparent at radio frequencies. For example, as indicated at block 208 of FIG. 2, encapsulation of the device 100 may be performed by a shrink-wrapping technique to produce a structure having a size that is about the same as a conventional financial card.

In an alternative embodiment indicated at block 210 of FIG. 2, the device may instead be affixed to a backboard having a standard size rather than being encapsulated. For example, the backboard may be sized similarly to a financial card, thereby again providing the device as part of a standard-sized unit.

Irrespective of how the standard-sized unit is produced, either by encapsulation or by affixing the device to a standard-sized backboard, each RF device is received at a preparation device 120 as indicated at block 212 of FIG. 2. The preparation device 120 may have a plurality of stations that are each adapted to perform a particular function. One or more of the stations, particularly those involved with specific functions using radio-frequency transmissions, may be enclosed within radio-frequency shielding 150. The operation of each station may be managed by a controller 124 that is also programmed to coordinate the movement of the encapsulating packages to the different stations as part of an automated process. The RF devices may be received by an input hopper 130 of the preparation device 120, from which it may be directed to different stations in accordance with instructions provided by the controller 124. FIG. 1 illustrates one particular sequence of stations to which the RF devices may be directed in a particular embodiment, but this illustration is not intended to be exclusive. In other embodiments, some of the stations may be bypassed or combined, additional stations may be included, or the order in which stations are visited may be changed.

In the illustrated embodiment, each RF device is initially moved to an RF encoder station 132, which is configured to encode the RF device with a particular RF identification code assigned to that device. This station will thus typically include a radio-frequency transceiver and an antenna to allow radio-frequency signals to be exchanged with the transponder 112 of the RF device and to identify the specific device. A database comprised by or accessible by the controller 124 includes an identification of the particular RF identification code to be assigned to the specific device, allowing that code to be transmitted to the transponder 112 with the antenna at the RF encoder station 132 as indicated at block 216 of FIG. 2. The database may additionally correlate the assigned RF identification code with a particular individual, such as an anticipated recipient of the device, and such recipient's address. In some instances, the code may be further correlated with one or more financial accounts to enable the device to be used in providing access to such financial accounts.

In some embodiments, a check may be made to ensure that the RF identification code was correctly written to the transponder 112 by moving the RF device to an RF verifier station 134 as indicated at block 220. This station may also include an antenna and transceiver to allow exchange of radio-signal information with the device's transponder. The transponder is activated at the station, and an identification signal that purports to include the RF identification code is transmitted to the station. A check is made whether the received RF identification code matches the code assigned to that RF device by having the controller 124 check the database records of the assigned code and performing a comparison. In some instances, the RF encoder and RF verifier stations 132 and 134 may be the same station, but in other embodiments they are different stations. If the RF identification code written to the RF device is not successfully verified, the RF device may be moved to a reject bin 135, allowing the device to be discarded in the event that the transponder 112 is defective.

If the RF identification code is verified, the RF device may be moved to a packager station 136 where it may be packaged as indicated at block 228. In some embodiments, it may be packaged within an envelope, particularly if the device is sufficiently small. The package may be labeled at block 232 by moving it to a labeler 138. In some embodiments, such labeling may be unnecessary, such as where packaging the device provides automatic labeling through an envelope window.

The labeling information may include electronically readable elements (bar codes, MICR codes, etc.) in addition to standard printed mailing information (i.e., name, street address, city, state, zip code, etc.).

After the package is labeled, the completed and labeled package will be moved to a recipient verification station 140, in order to have its mailing label on the package and its RF identification code verified and compared (block 234) to make sure that the RF device is properly labeled for delivery to the correct recipient/account holder. As should be appreciated, there are occasional opportunities for errors to occur in packaging/labeling steps, such the label being improperly printed or the application of two labels to the package (one over the other). While such errors may be infrequent, they can provide opportunities for an unintended recipient to use the RF device in a fraudulent or unauthorized manner. Accordingly, the recipient verification station 140 includes an RF reader 142 for reading the identification code from the packaged RF device, and a label reader 144 for reading the mailing label on the package. That information is used by the controller 124 to access the database and make sure that the RF device is being mailed to the correct recipient (e.g., the identification code and mailing information compare correctly).

The RF reader 142 may include an antenna and transceiver to allow exchange of radio-signal information with the device's transponder (much like the verifier station 134 described earlier). The transponder is activated by the RF reader, and an identification signal that includes the RF identification code for the RF device is transmitted to the RF reader 142. The label reader 144 may be a standard optical scanner (e.g., for reading a mailing bar code, if present). Alternatively, the reader may be of a type for reading MICR codes or of a type for reading and recognizing standard printed characters present in the mailing recipient's name or address on the label.

While the described embodiments illustrate the function of the RF reader 142 as separate from the function of the reader at the RF verifier station 144, such functions could in fact be performed by a single reader.

In some embodiments, the identification code read by the RF reader 142 is used by the controller 124 to access the records database and retrieve the authorized recipient's name and address. The authorized name and/or address is compared by the controller to the name and/or address read from the label by label reader 144. Optionally, only portions of the mailing label information need be verified against the account holder information in the database. For example, one commonly used bar code format for mailing labels includes bar code fields reflecting the nine digit U.S. zip code of the addressee, and the last two digits of the addressee's street number. The label reader 144 could read such information from the bar code, and if it matches the corresponding address information in the database, this may be viewed as adequate assurance that the mailing label is correct. As another example, the name of the recipient could be read (from the printed letters on the mailing label), especially when it may be important for only the correct account holder to receive the RF device (e.g., where more than one account holder may reside at a single address). The name read from the label may be compared to the account holder's name retrieved from the database.

If the recipient/address on the mailing label is correct, the RF device is then moved at block 236 to an output bin 146, from which the packaged devices may be mailed or otherwise distributed (via postal service, courier or other delivery service) to customers. If the intended recipient/address does not match the mailing recipient/address indicated on the package label, the package is moved at block 238 to a reject bin 148, from which the package can be taken for re-labeling or other attention.

In a particular set of embodiments, usually where the size of the RF devices is small, the RF devices may be provided on a reel. This may be suitable, for example, where the RF devices comprise individual chips. The reel may conveniently be fed through the stations of the preparation device 120, which may additionally include a station equipped to separate the RF devices. For example, such a station could be equipped with a cutting tool to cut the reel between RF devices, advantageously using a known separation distance between devices defined by the structure of the reel.

Figure 3:
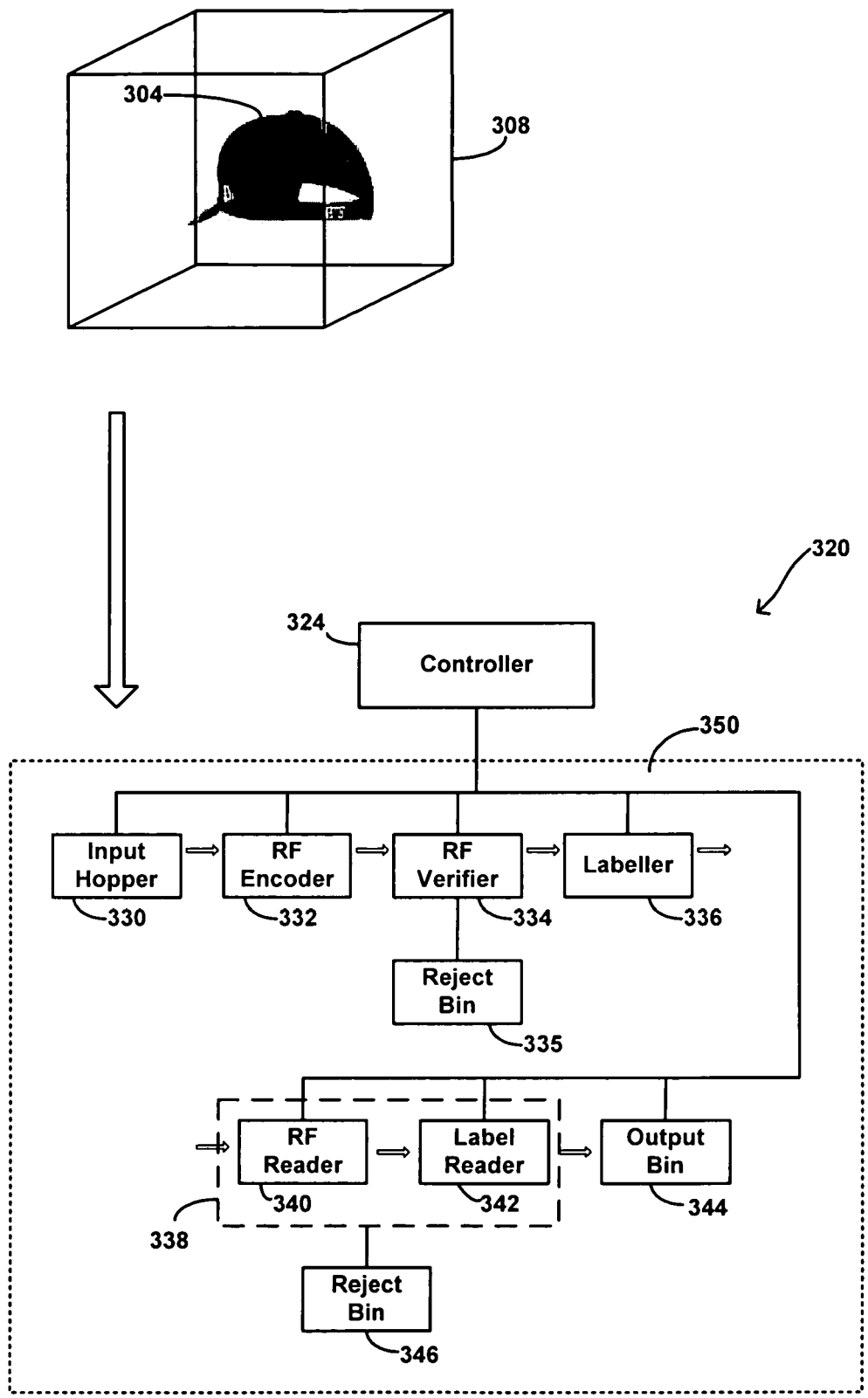
FIG. 3 is a schematic illustration of a further embodiment of a system providing automated preparation of RF devices for distribution.
Figure 4:
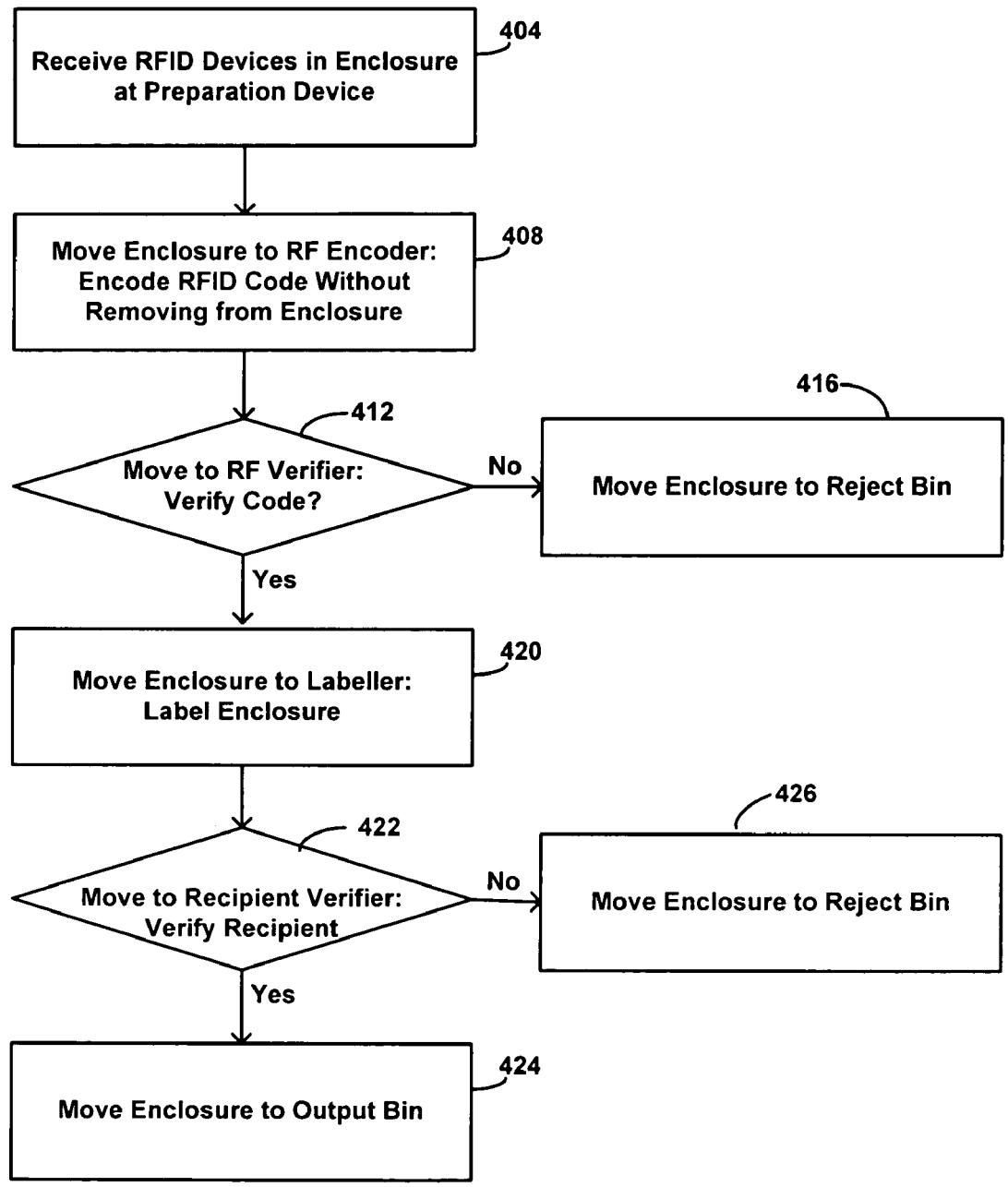
FIG. 4 is a flow diagram illustrating a method for automated preparation of RF devices for distribution using the system of FIG. 3.

In some embodiments, the methods of the invention may be applied to RF devices that may initially be received in enclosures. This may be true, for example, where the RF devices are to be sold to customers in the enclosures or where the RF devices are larger. For instance, an RF device may be provided as a stored-value instrument that takes the form of a baseball cap. Such a device could be provided for sale to children at an amusement park, enabling the child to wear the cap and have value decremented automatically as he/she partakes in amusements. The form of the devices is virtually endless and may include such things as necklaces, bracelets, shoes, teddy bears, etc. FIG. 3 provides an illustration of a system that is suitable for preparing such RF devices, and is accompanied by the flow diagram of FIG. 4 illustrating a method for using the system of FIG. 3. The following description therefore makes reference to both FIGS. 3 and 4.

The example used for the RF device in FIG. 3 is a baseball cap 304, which is shown schematically to be enclosed within a box 308. More realistically, the box enclosure 308 would contain packing material to protect the item, but such material should not interfere with the preparation operations since it will generally be transparent at radio frequencies. As indicated at block 404 of FIG. 4, the enclosure is received at a preparation device 320, such as in the input hopper 330 identified in FIG. 3. The preparation device 320 is equipped to move the enclosure to a plurality of stations where preparation functions may be executed, and may include radio-frequency shielding 350, particularly around those stations whose functions use radio-frequency transmissions. In some embodiments, the structure of the preparation device 320 may be designed to accommodate enclosures having certain predefined sizes, although in other embodiments a variation of enclosure sizes may be accommodated by using position-recognition techniques, such as cameras, position sensors, and the like. The sequence of stations illustrated for the preparation device 320 in FIG. 3 is not intended to be limiting. In other embodiments, more or fewer stations may be provided and/or the stations may be encountered in a different order or combined. A controller 324 is provided to coordinate movement of the enclosures and to control operations performed on the enclosures at the different stations.

Thus, similar to other embodiments described above, the enclosure may be moved at block 408 to an RF encoder station 332 equipped with a transceiver and antenna for exchanging radio-frequency information with the RF device. Using techniques similar to those described above, the RF device is encoded with an assigned RF identification code as determined by the controller 324. Such encoding is performed without removing the RF device from the enclosure. In embodiments where a verification is performed to ensure that the correct RF identification code has been written to the RF device, the enclosure may be moved at block 412 to an RF verifier station 334 that is also equipped with a transceiver and antenna for communication with the transponder in the RF device. The RF verifier station 334 requests identification of code written to the RF device so that it may be compared by the controller 324 with the code that was to have been assigned. In other embodiments, the verification and encoding functions may be performed at a single station. If the verification fails, the enclosure may be moved at block 416 to a reject bin 335. If the verification confirms that the correct code has been written, however, the enclosure may be moved at block 420 to a labeler 336 so that a recipient may be identified and a mailing label provided. Because the RF device is already packaged in the enclosure 308, it may be sufficient simply to label the enclosure 308 at block 420 at a labeler station 336 without needing to package the enclosure 308 further.

The enclosure may then be moved to a recipient verification station 338, equipped with an RF reader 340 for reading the identification code transmitted by the RF device and a label reader 342 for reading mailing information, as indicated at block 422, so that the controller 324 may verify that the RF device is being mailed to the correct recipient. If the recipient is correct, the labeled enclosure may then be directed at block 424 to an output bin 344, from which it may be mailed or otherwise distributed to a recipient. If the recipient on the mailing label does not match the account information in the database as determined by the RF identification code, the RF device is moved at block 426 to a reject bin 346.

Figure 5:
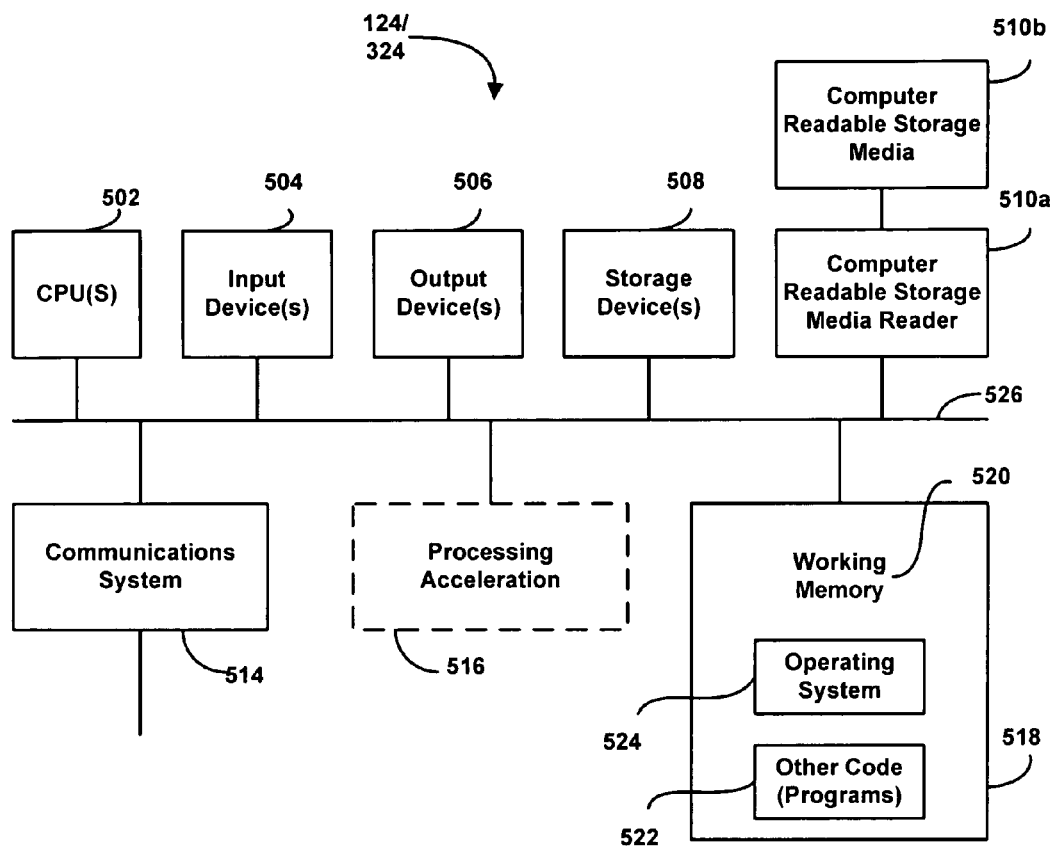
FIG. 5 is a schematic illustration of a controller that may be used with the automated systems in embodiments of the invention.

FIG. 5 provides a schematic illustration of a structure that may be used to implement the host system controller 124 or 324 in the preceding embodiments. FIG. 5 broadly illustrates how individual system elements may be implemented in a separated or more integrated manner. The controller is shown comprised of hardware elements that are electrically coupled via bus 526, including a processor (CPU) 502, an input device 504, an output device 506, a storage device 508, a computer-readable storage media reader 510a, a communications system 514, a processing acceleration unit 516 such as a DSP or special-purpose processor, and a memory 518.

The computer-readable storage media reader 510a is further connected to a computer-readable storage medium 510b, the combination comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be exchanged with other devices. Records of assigned RF identification codes, recipient/account holder names and mailing information, and the like may be stored on the storage device 508, storage medium 510b, or may accessible from remote storage through the communications system 514. The collective data storage devices provide a database function for carrying out the various encoding and verification steps described earlier.

The controller also comprises software elements, shown as being currently located within working memory 520, including an operating system 524 and other code 522, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. For example, the database look-up function described earlier in connection with recipient verification (e.g., at stations 140, 338) refers to the RF identification code being read to retrieve recipient information from the database (and then comparing such retrieved information to the mailing information read by the label reader). It should be appreciated that database look-up could be reversed, i.e., done in response to mailing information (e.g., reading a mailing bar code or a recipient's name and/or address from the mailing label), using that mailing information to retrieve RF identification code information from the database, and then comparing at the controller the identification code retrieved from the database with the identification code read from the RF device. Further, although the RF device is described as one used by a person (i.e., account holder) to conduct financial transactions, it should be appreciated that the RF device may have other purposes. As an example, the RF device could be affixed to products that are to be distributed in bulk (multiple products in a delivery package) to suppliers/merchants, and in such instance the recipient verification station could used to make sure that the products in a bulk package are properly labeled for distribution to the correct supplier/merchant for eventual sale to customers at a retail establishment.

Accordingly, the above description should not be taken as limiting the scope of the invention, which is defined in the following claims.

What is claimed is:

1. A method for preparation of an RF device for distribution, comprising:
   providing an ID label for use in delivery of each RF device;
   receiving an identification code emitted from the RF device;
   reading the ID label; and
   comparing information associated with the identification code with information associated with the ID label.

2. The method of claim 1, wherein the preparation for distribution is preparation for mailing to a recipient, wherein the RF device is packaged for mail delivery prior to providing an ID label, wherein the ID label is a mailing label with the name and address of the recipient, and wherein the mailing address is read after applied to the package.

3. The method of claim 2, wherein the mailing label further includes a bar code.

4. The method of claim 3, wherein a database is accessed in response to at last one of the steps of receiving the identification code from the RF device and reading the bar code on the mailing label, and wherein the correct address for delivery of the RF device is verified by comparing the information associated with the identification code with the information associated with the bar code.

5. The method of claim 1, wherein the ID label comprises printed delivery information used in order to deliver the RF device to a recipient.

6. The method of claim 5, wherein the ID label is a mailing label.

7. The method of claim 5, further comprising:
   verifying that the identification code emitted from the RF device corresponds to an address that matches a delivery address on the ID label.

8. The method of claim 5, further comprising:
   inserting each of the RE devices into an envelope for mailing; and
   applying the ID label to the envelope.

9. The method of claim 5, further comprising:
   incorporating each of the RF devices into a structure having the size of standard presentation instrument.

10. The method of claim 9, wherein the step of incorporating comprises heat shrink wrapping each of the RF devices.

11. The method of claim 9, wherein the step of incorporating comprises affixing each RF device to a backboard of having the size of a financial card.

12. The method of claim 5, wherein the compared information is account holder address information.

13. The method of claim 5, wherein the compared information is account holder name information.

14. A system for preparing an RF device for delivery to the holder of an account associated with the RF device, comprising:
   a labeler for preparing a mailing label for use in delivering the RF device;
   an RF reader for reading an identification code emitted by the RF device;
   a label reader for reading mailing information from the mailing label; and
   a processor for accessing a database in response to the operation of at least one of the RF reader and the label reader, for retrieving account holder information from the database, and for using the retrieved information to verify the mailing information from the mailing label.

15. The system of claim 14, further comprising a packager for packaging the RF device for delivery to the account holder, wherein the RF reader reads the identification code after the RF device is packaged.

16. The system of claim 14, wherein the labeler applies the mailing label to the package, and wherein the label reader reads mailing information from the mailing label after applied to the package.

17. The system of claim 14, wherein the identification code read, from the RF device is used to retrieve mailing information from the database.

18. The system of claim 14, wherein the mailing information read from mailing label is used to retrieve RF device information from the database.

19. The system of claim 14, wherein the mailing information comprises the account holder name.

20. The system of claim 14, wherein the mailing information comprises the account holder address.

21. The system of claim 14, wherein the delivery of the RF device is through a postal service.

22. The system of claim 14, wherein the delivery of the RF device is through a courier service.

23. A system for verifying a mailing label used with an RF device, wherein the RF device emits an identification code and wherein stored mailing information intended for use in delivery of the RF device is associated with the identification code, the system comprising:
   an RF transceiver for receiving the identification code from the RF device; and
   a label reader for reading mailing information from the mailing label, the label mailing information used for delivery of the RF device, whereby the label mailing information may be compared to the stored mailing information.

24. A system for verifying a mailing label used with an RF device, wherein the mailing label has mailing information thereon to be used for delivery of the RF device, wherein the RF device emits an identification code, and wherein the system has stored mailing information associated with the identification code and intended to be used for delivery of the RF device, the system comprising:
   means for reading the identification code from the RF device; and
   means for reading mailing information from the mailing label, whereby the label mailing information may be compared to the stored mailing information.

* * * * *